G. R. EVANS.
TAR AND DEBRIS TRAP.
APPLICATION FILED APR. 16, 1909.
943,628.
Patented Dec. 14, 1909.
2 SHEETS—SHEET 1.
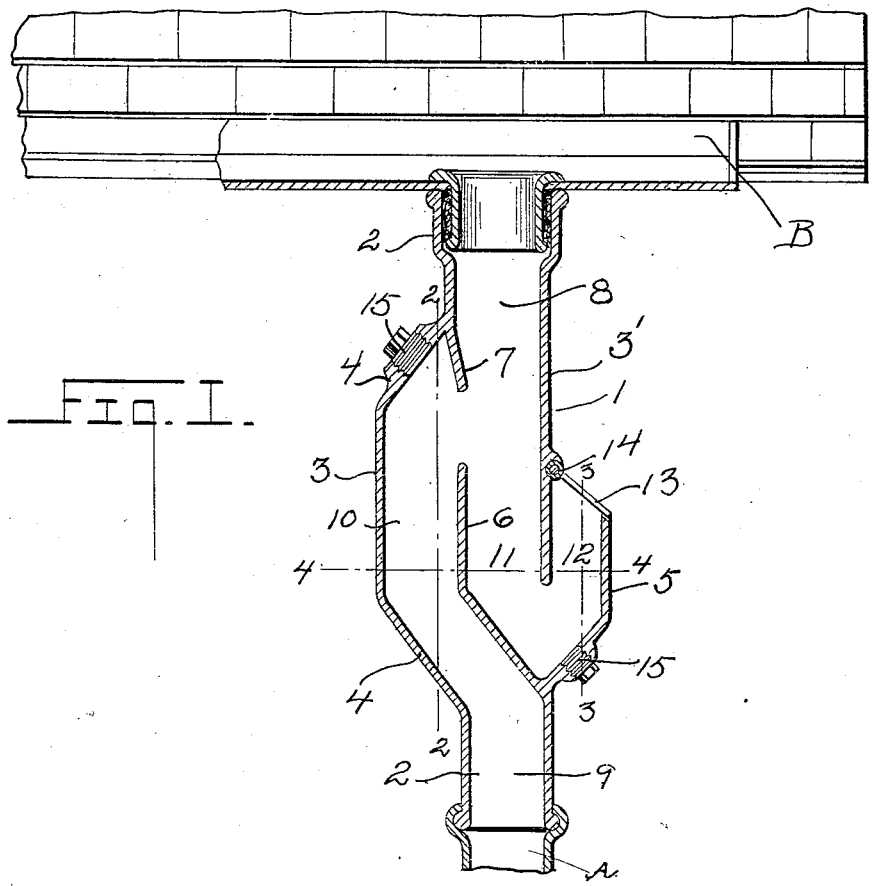
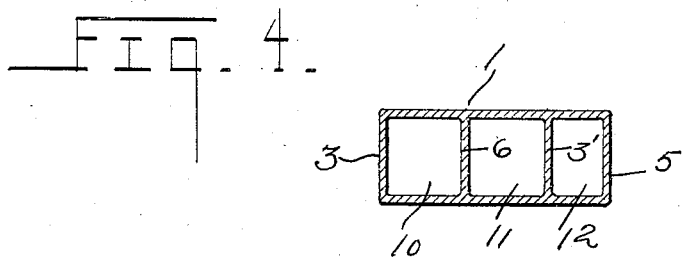
Witnesses
E. E. Johansen
E. L. Chandlee
Inventor
George R. Evans.
By Woodward & Chandlee
Attorney G. R. EVANS.
TAR AND DEBRIS TRAP.
APPLICATION FILED APR. 16, 1909.
943,628.
Patented Dec. 14, 1909.
2 SHEETS—SHEET 2.
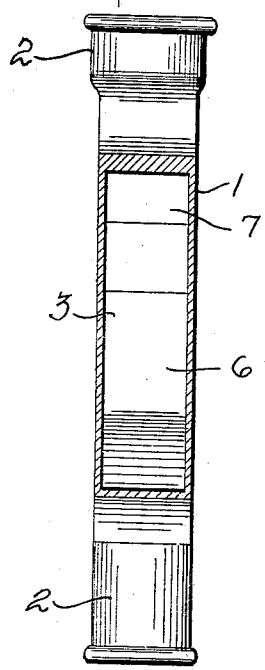
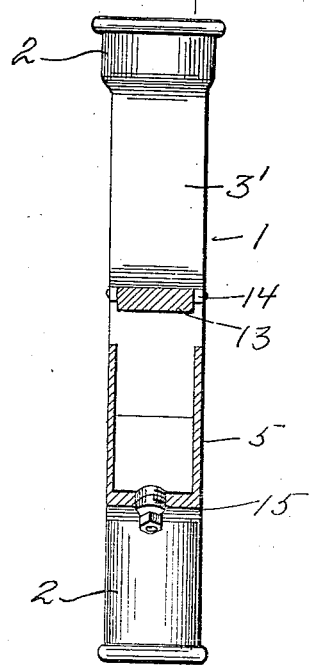
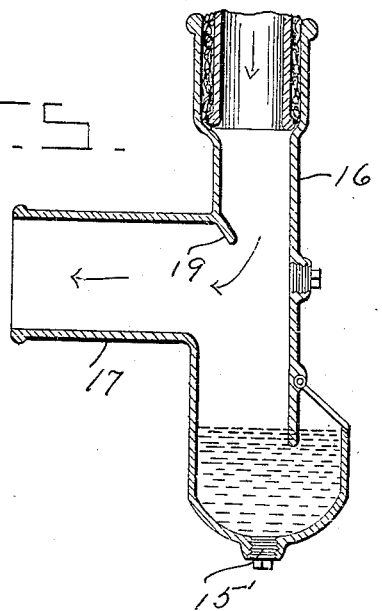
Witnesses
E. E. Johansen
E. L. Chandler
Inventor
George R. Evans
By Woodward & Chandler
Attorney

UNITED STATES PATENT OFFICE.

GEORGE R. EVANS, OF BERKELEY, CALIFORNIA.

TAR AND DEBRIS TRAP.

943,628.

Specification of Letters Patent.

Patented Dec. 14, 1909.

Application filed April 16, 1909. Serial No. 490,225.

*To all whom it may concern:*

Be it known that I, GEORGE R. EVANS, a citizen of the United States, residing at Berkeley, in the county of Alameda and State of California, have invented certain new and useful Improvements in Tar and Debris Traps, of which the following is a specification.

This invention relates to traps and more particularly to a trap which is designed to be placed within a rain water pipe beneath the trough of a tar and gravel roof.

The primary object is to provide a trap of this class in which the particles of tar and gravel detached by the action of the water, will be intercepted and prevented from entering the sewer, thereby obviating the liability of the continued deposits eventually closing the sewer.

Another object is to provide a trap which is so constructed that the tar collected therein will be automatically discharged.

A further object is to provide a trap which is simple and inexpensive in construction and one which may be easily and quickly cleaned when desired.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like characters of reference indicate similar parts in the several views, Figure 1 is a vertical section showing my improved trap in position beneath the rain trough of a roof. Fig. 2 is a section on the line 2—2 of Fig. 1. Fig. 3 is a section on the line 3—3 of Fig. 1. Fig. 4 is a horizontal section on the line 4—4 of Fig. 1. Fig. 5 is a vertical section of a slightly modified form of trap.

Referring to the drawing 1 indicates a preferably cast iron casing, rectangular in form for the greater portion of its length and formed with the cylindrical upper and lower ends 2, by means of which the trap may be secured between the drain pipe A and the roof trough B, as clearly shown in Fig. 1.

The body of the trap comprises the vertical side walls 3, 3', the sloping top and bottom walls 4, a laterally and a vertically extending plate 5, and the partition plate 6. The wall 3' extends some distance below the top of the wall or plate 5 and forms a dividing plate. The partition plate 6 extends in parallel relation with the sloping bottom wall 4 to a point where it is projected upwardly in approximate alinement with the wall of the lower cylindrical end 2. At the point of juncture of the upper sloping side wall 4 and the cylindrical portion 2 of the trap, I have formed the inwardly extending deflecting wall 7, which is quite short and has its end disposed over and inside of the partition plate 6.

It will be noted that by the above disposition of the various partition plates the passages 8, 9, 10, 11 and 12 are formed. The walls 3', 5 and 6 provide the passages 11 and 12, which constitutes the trap portion of my device. A closure plate 13 is hinged as at 14 to the wall 3', the outer end of which rests upon the upper edge of the wall 5. This plate is disposed at an angle and will effectually prevent the entrance of foreign matter. The water will flow through the passages 8, 9, and 10, while the tar, gravel or other debris will strike the deflecting plate 7 and be precipitated into the trap below. As the deposits accumulate in the trap, the material will pass from the passage 11 to the adjacent passage 12 upon the opposite side of the wall 3'. The debris will continue to rise in this passage until the closure plate 13 is forced upward and the material is gradually forced over the edge of the plate 5. Cleanout plugs 15 are provided by means of which all of the passages may be readily cleared of any paper or other matter which may have collected therein.

In Fig. 5 I have shown a slightly modified form of my improved trap which is designed to be attached to the end of the drain pipe. It comprises the cast iron casing 16 which is formed with the horizontal extension 17. At the juncture of the vertical and horizontal portions the inwardly projecting deflecting plate 19 is formed, similar to the plate or wall 7 as before shown and described. The vertical side wall is extended below the horizontal extension 17 and forms the dividing plate of the trap. The trap is closed at the bottom by a cleanout plug 15' and a similar plug is provided in the side of the casing.

The operation of the trap is precisely the same as that before described with the exception that the water will pass through the extension 17 instead of discharging below the trap as in the first instance. Preferably, a small quantity of tar is introduced into the angle of the passages 11 and 12, to close the opening under the wall 3', to prevent escape of water through the trap when first subjected to use.

Having thus described my said invention, what I claim as new and desire to secure by United States Letters Patent is:—

1. A trap of the character described comprising a water inlet, a deflecting plate projecting into said inlet, a debris cup formed integral with said trap and extending beyond the body thereof, said trap being located beneath said water inlet, the side plate of the body of said trap extending into said debris cup to form a water seal, a closure plate for said cup pivoted upon the side of the body of the trap, and a water outlet, substantially as and for the purpose set forth.

2. A trap of the character described comprising a substantially rectangular body portion, an upper and lower water inlet and outlet, a deflecting plate formed integral with the body of said trap and projecting into said inlet opening, a debris cup located within said inlet and projecting beyond the body of said trap, one side of said trap projecting into said debris cup to form a water seal, the inner wall of said cup being disposed beyond the lower edge of said deflecting plate, a pivoted closure for said cup, and cleanout openings formed in the bottom of said cup and in said trap, substantially as and for the purpose set forth.

3. A trap of the character described comprising a substantially rectangular body portion having upper and lower cylindrical inlet and outlet openings, the lower portion of the body of said trap being disposed at an angle, a partition plate extending in parallel relation to the wall of said trap, a deflecting plate projecting into said inlet opening, the lower edge of said plate being disposed out of vertical alinement with said partition plate, a laterally and upwardly extending plate formed integral with the body of said trap and disposed beyond the side thereof, the side wall of said trap projecting below the top of said last mentioned plate and said partition plate, closure plates for said debris cup pivoted to one side of the body of said trap and normally disposed at an angle thereto, and cleanout plugs in the bottom of said debris cup and the side of said trap, substantially as and for the purpose set forth.

In testimony whereof I affix my signature, in presence of two witnesses.

GEORGE R. EVANS.

Witnesses:
P. A. PIODA,
EDITH W. BURNHAM.